United States Patent [19]

Sjobom

[11] Patent Number: 5,515,253
[45] Date of Patent: May 7, 1996

[54] L.E.D. LIGHT ASSEMBLY

[76] Inventor: Fritz C. Sjobom, 9255 Magnolia Ave., Santee, Calif. 92072

[21] Appl. No.: 453,637

[22] Filed: May 30, 1995

[51] Int. Cl.$^6$ .................................................. F21V 5/00
[52] U.S. Cl. ..................... 362/244; 359/624; 362/291; 362/332; 362/333; 362/339; 362/800
[58] Field of Search ..................... 362/244, 800, 362/291, 339, 332, 333; 359/454, 455, 456, 623, 624

[56] References Cited

U.S. PATENT DOCUMENTS

| | | | |
|---|---|---|---|
| 4,467,193 | 8/1984 | Carroll | 362/800 |
| 4,733,335 | 3/1988 | Serizawa et al. | 362/800 |
| 5,093,768 | 3/1992 | Ohe | 362/800 |
| 5,174,649 | 12/1992 | Alston | 362/800 |
| 5,408,395 | 4/1995 | Schmid et al. | 362/800 |

FOREIGN PATENT DOCUMENTS 2139340  11/1984  United Kingdom ................... 362/800

*Primary Examiner*—Denise L. Gromada
*Assistant Examiner*—Alfred Basichas
*Attorney, Agent, or Firm*—Charles C. Logan, II

[57] ABSTRACT

A L.E.D. light assembly having a refractive lens having a front surface and a rear surface. A plurality of horizontal rows of pillow lens modules are formed on the rear surface of the refractive lens. The respective edges of the pillow lens modules coincide with adjacent pillow block lens modules to form both vertical and horizontal intersection lines. A plurality of vertically oriented convex or concave flute strips are formed on the front surface of the refractive lens in the front surface of these respective vertical intersection lines. A plurality of L.E.D.'s are mounted on a printed circuit board spaced a predetermined distance behind the rear surface of the refractive lens. There is one L.E.D. for every pillow lens module. Vertical oriented planar strips are formed on the front surface of the refractive lens intermediate each of the vertically oriented convex or concave flute strips. The combined effect of the different structures forming the refractive lens is to produce light emitted from the front surface of the refractive lens that has a solid look with no dark spots being projected forwardly from the L.E.D. assembly.

9 Claims, 2 Drawing Sheets

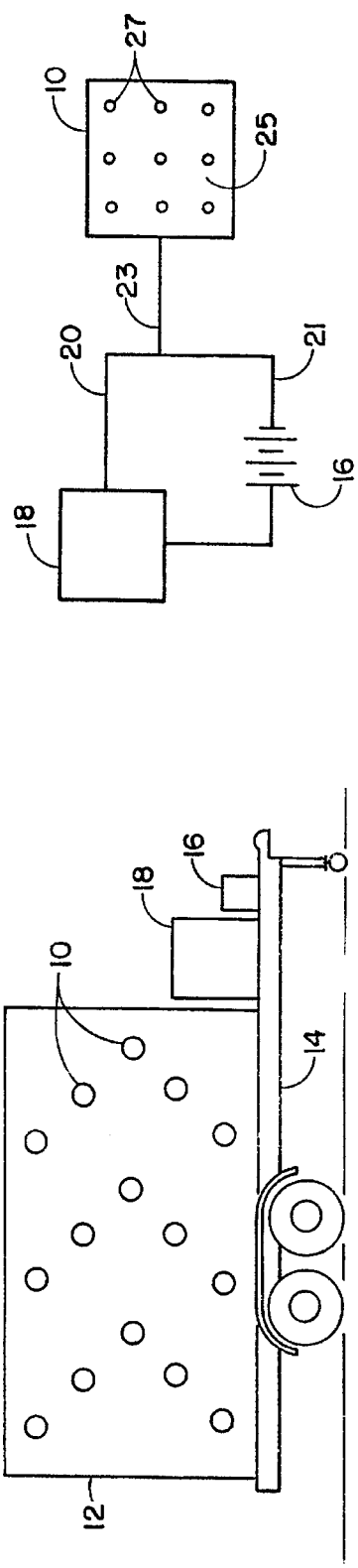
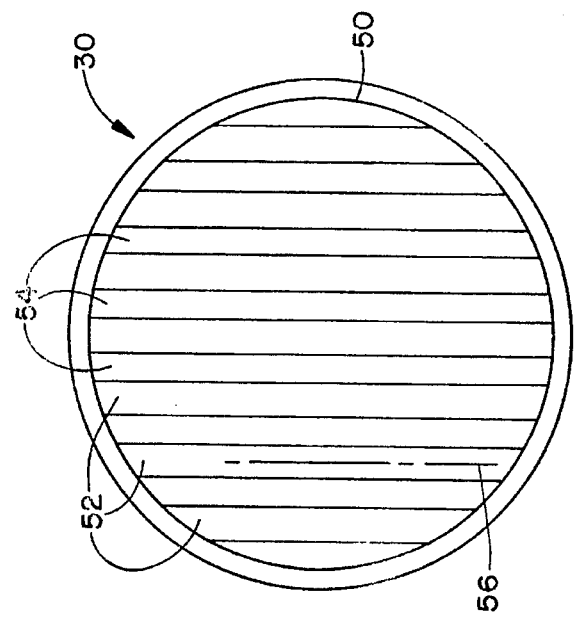
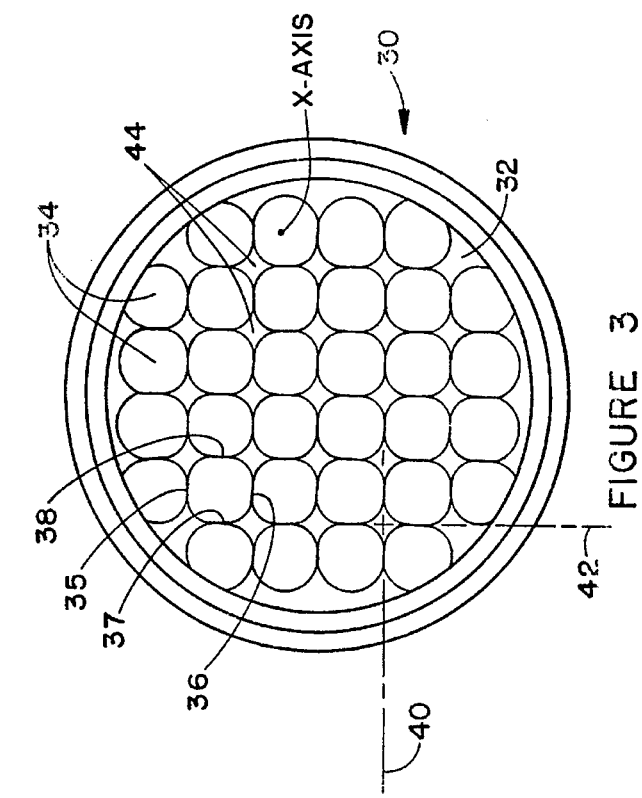

L.E.D. LIGHT ASSEMBLY

BACKGROUND OF THE INVENTION

The invention relates to a light assembly having a refractive lens and more specifically one that utilizes L.E.D.'s for the source of illumination.

Typically most light assemblies have either incandescent bulbs or fluorescent bulbs providing the source of illumination. These type of light sources can vary the degree of brightness depending upon the particular application for which the light assembly is used. Often these light sources require reflectors to direct most of the light rays along a forward pattern. Incandescent and fluorescent lights are usually fairly large and result in the light assembly having a relatively large depth to it. Additionally, incandescent bulbs and fluorescent bulbs require a relatively great amount of electricity to operate them.

It is known that the use of light emitting diodes (L.E.D.'s) consume substantially less power than incandescent light bulbs or fluorescent light bulbs. However, typically, the radiant power of L.E.D.'s has been limited so that they have been used primarily for short-range applications such as panel indicators or indoor signs. L.E.D.'s have proven useful when their size has not been a significant factor because they are viewable from short distances. Unfortunately, use of L.E.D.'s in outdoor applications such as traffic lights has been limited due to high levels of ambient light. Even with the advent of ultra-bright L.E.D.'s, large clusters of L.E.D.'s are required to achieve adequate target sized definition. The longer distances involved in outdoor illumination devices, the brightness of ambient light conditions, and limits of resolution of the human eye are among the factors which require clusters of large numbers of L.E.D.'s in known systems. Unfortunately, these clusters are expensive.

Another problem prevalent with the use of L.E.D.'s positioned behind a refractive lens is the fact that dark spots or dead spots are often produced in which no illumination is transmitted. This has been acceptable in some applications and has resulted in limited use of L.E.D.'s as the source of illumination for outdoor signs or traffic signals.

It is an object of the invention to provide a novel L.E.D. light assembly that substantially eliminates dark spots or dead spots from the front surface of the refractive lens.

It is also an object of the invention to provide a novel L.E.D. light assembly that uses substantially less power than incandescent light bulbs for similar applications of a light assembly.

It is also an object of the invention to provide a novel L.E.D. light assembly that is economical to manufacture and market.

It is an additional object of the invention to provide a novel L.E.D. assembly that can be used with outdoor signs or traffic signals and provide sufficient long range visibility that they are acceptable.

SUMMARY OF THE INVENTION

The novel L.E.D. light assembly has been primarily designed for use with an outdoor sign or traffic signal. A specific example would be the use of a display panel that is set up along a road to indicate road construction or narrowing of a traffic pattern. Often these display panels are mounted on a trailer thereby making them portable and easy to transport from one location to another. Some of these display panels are powered by a battery and/or a diesel generator. In some instances solar powered panels are used to charge the batteries.

The lens of the L.E.D. light assembly has a rear surface having a plurality of horizontal rows of pillow lens modules formed thereon. The convex shape of the pillow lens modules allows them to collect light from L.E.D.'s positioned a predetermined short distance behind them. There is an L.E.D. for every pillow lens module.

The front surface of the refractive lens has a plurality of vertically oriented convex or concave flute strips that are positioned in front of the respective vertical intersection lines between adjacent pillow lens modules. A vertical planar strip is formed on the front surface of the refractive lens intermediate each of the vertically oriented flute strips. If the entire front surface of the refractive lens was planar, there would be dark spots immediately in front of the vertical intersection lines between adjacent pillow modules. By positioning the vertically oriented flute strips in front of these vertical intersection lines, these dark spots or dead spots are eliminated. Since the primary purpose of the L.E.D. light assembly is to project light in a horizontal band, the convex or concave flute strips are only oriented in a vertical direction.

By varying the radius, the curvatures, and thickness of the fluted strips and also the pillow lens modules, different desired light patterns can be obtained.

DESCRIPTION OF THE DRAWINGS

FIG. 1 is a side elevation view of the L.E.D. light assemblies installed in an outdoor sign mounted on a trailer;

FIG. 2 is a schematic illustration of the electrical circuit used by the outdoor display unit;

FIG. 3 is a rear elevation view of the novel refractive lens;

FIG. 4 is a front elevation view of the novel refractive lens;

DESCRIPTION OF THE PREFERRED EMBODIMENT

Figure 6:
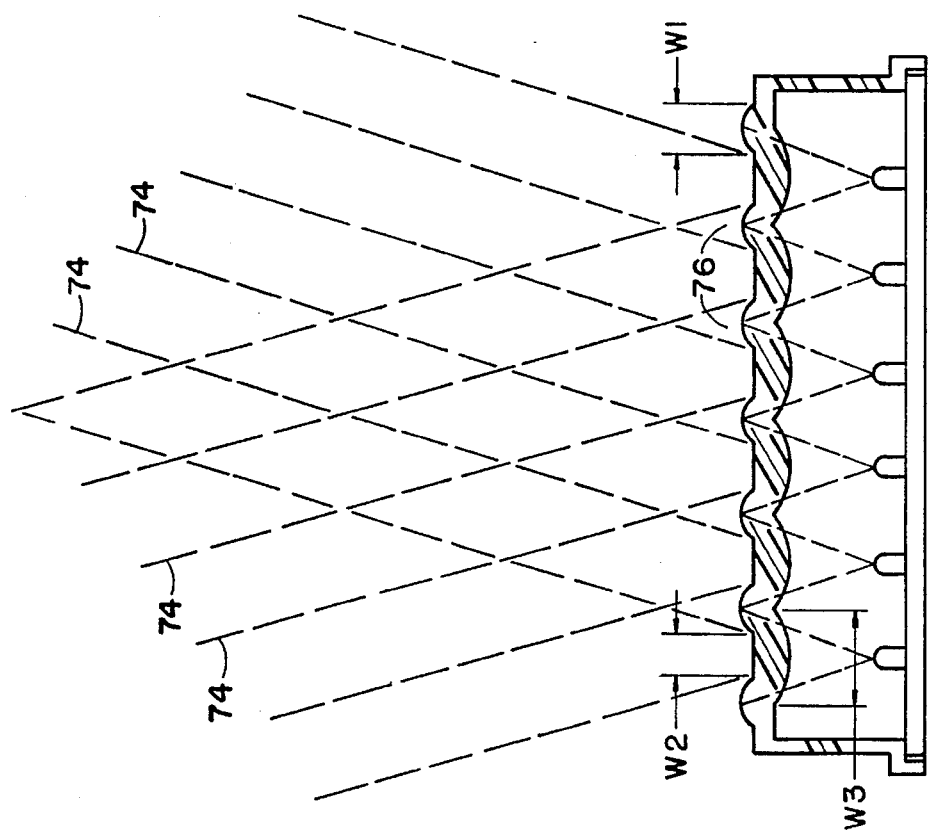
FIG. 6 is a schematic horizontal cross sectional view only illustration showing the manner in which the light rays from the L.E.D.'s are directed through the vertically oriented planar strips.

The novel L.E.D. light assembly will now be described by referring to FIGS. 1–6 of the drawings.

In FIGS. 1 and 2, the L.E.D. light assembly is generally designated numeral 10 and multiple units of it are mounted in display panel 12. Display panel 12 is mounted on a trailer 14 and the individual L.E.D. light assemblies 10 are powered by battery 16 and/or diesel generator 18. In FIG. 2, the electrical current passes through conductors 20 and 21 to conductor 23 that is connected to printed circuit board 25. Individual L.E.D.'s 27 are mounted on the P.C. board and they are electrically connected together by a printed circuit on the board.

FIG. 3 is a rear elevation view of the refractive lens 30. It has a rear wall surface 32 having a plurality of pillow lens modules 34 each having a convex surface. These pillow lens modules each have a top edge 35, a bottom edge 36, a left edge 37, and a right edge 38. Horizontal intersection lines 40 and vertical intersection lines 42 are formed where the adjacent pillow lens modules 34 contact each other. Intermediate the respective pillow lens modules 34 are intersection flats 44. Each pillow lens module 34 also has a central horizontal x-axis that is substantially perpendicular to rear wall surface 32.

FIG. 4 is a front elevation view of the refractive lens 30 and it has a front wall surface 50. Vertically oriented convex flute strips 52 extend from the top edge of refractive lens 30 to its bottom edge and they are found across the entire width of the refractive lens. Vertical planar strips 54 are formed on front surface 50 of refractive lens 30 intermediate each of vertically oriented convex flute strips 52. Each of the convex strips 52 have a vertical center line axis 56. Vertical center line axis 56 is positioned immediately in front of vertical intersection lines 42 of the respective lens modules 34.

Refractive lens 30 has a front surface 50, and an annular side wall surface 60. An external annular shoulder 62 is formed adjacent the rear end of annular side wall 60 and an internal shoulder 64 provides a nesting structure for the printed circuit board 25. P.C. board 25 is spaced a predetermined distance D1 from the rear surface 32 of refractive lens 30.

Convex fluted strips 52 have a predetermined width W1 and the vertical planar strips 54 formed between them have a predetermined width W2. Pillow lens modules 34 have a predetermined width W3. Light rays 70 seen in FIG. 5 only depict the portion of the light rays from the individual L.E.D.'s that are passing through the vertical convex flute strips 52. Dark spots 72 result between the respective vertical convex flute strips 52.

FIG. 6 only depicts the light rays 74 that travel through the front surface of vertical planar strip 52. In FIG. 6 the dark spots would be identified by numeral 76. Both the dark spots 72 and 76 would be eliminated if FIGS. 5 and 6 were viewed cumulatively or overlapped on top of one another and that is what in reality happens with the light rays emanating from the front of refractive lens 30. The respective dark spots 72 and 76 would not be observed in the light projected forwardly from refractive lens 30.

Figure 5:
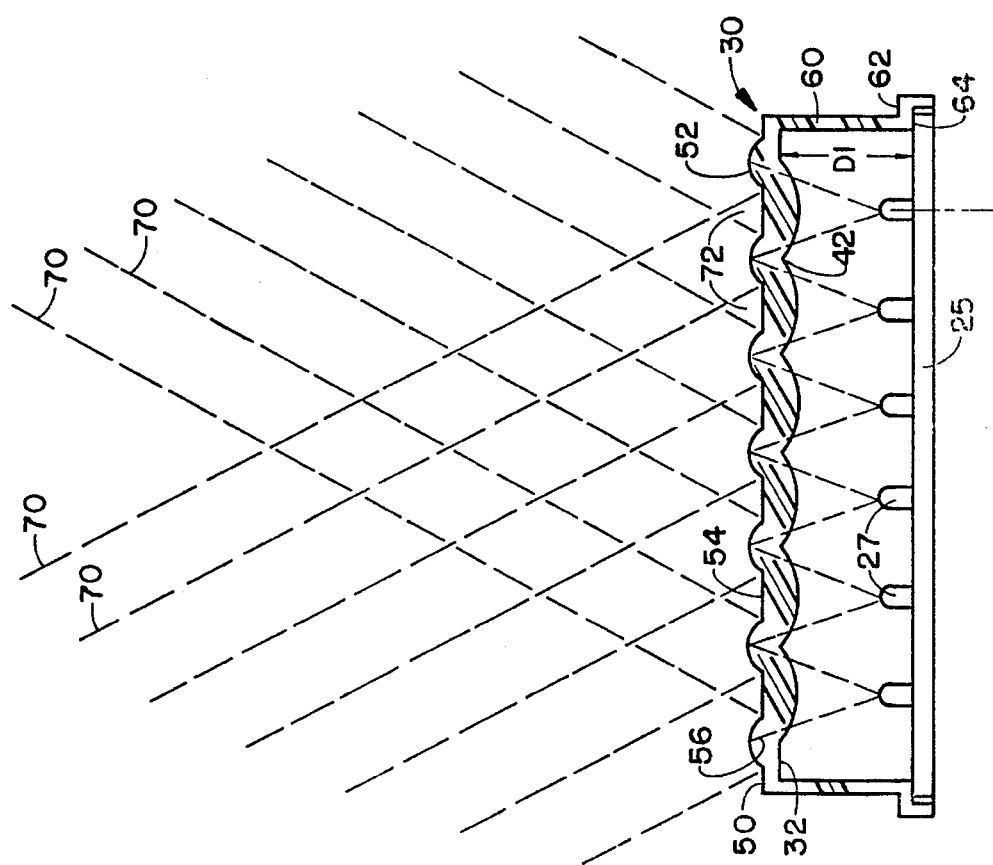
FIG. 5 is a schematic horizontal cross sectional view only illustrating the manner in which the light rays from the L.E.D.'s are directed through the convex vertically oriented flute strips.

The refractive lens 30 illustrated in FIGS. 4–6 show the vertical strips having a convex front wall surface. It is to be understood that the front wall surface could also be concave.

What is claimed is:

1. A L.E.D. light assembly comprising:

a refractive lens having a front surface, a rear surface, a top edge, a bottom edge, a left edge and a right edge;

at least one horizontal row of pillow lens modules formed on the rear surface of said refractive lens; said horizontal row having at least two pillow lens modules, said pillow lens modules each having a top edge, a bottom edge, a left edge, a right edge, and a horizontal center line x-axis; the respective right and left edges of adjacent pillow block lens module coincide to form vertical intersection lines, a plurality of L.E.D.'s each having a longitudinally extending z-axis; an individual L.E.D. is mounted a predetermined distance D1 behind each of said pillow lens modules; the z-axes of said L.E.D.'s being substantially aligned with the horizontal center line x-axes of said pillow lens modules;

a plurality of vertically oriented convex flute strips and each has a longitudinally extending y-axes; said vertically oriented convex flute strips being formed on the front surface of said refractive lens in front of the respective vertical intersection lines between adjacent pillow lens modules and in substantial parallel alignment with said vertical intersection lines; and vertical planar strips are formed on the front surface of said refractive lens intermediate each of said vertically oriented convex flute strips.

2. A L.E.D. light assembly as recited in claim 1 wherein said vertical convex flute strips have a width W1 and said vertical planar strips have a width W2 and W2 is greater than W1.

3. A L.E.D. light assembly as recited in claim 2 wherein said pillow lens modules have a width W3 and W3 is greater than W2.

4. A L.E.D. light assembly as recited in claim 1 wherein said refractive lens has a circular shape and has an annular side wall extending rearwardly from its respective edges.

5. A L.E.D. light assembly as recited in claim 1 wherein said refractive lens is made of plastic material.

6. A L.E.D. light assembly as recited in claim 1 wherein there are at least two horizontal rows of pillow lens modules.

7. A L.E.D. light assembly as recited in claim 1 wherein there are a plurality of said L.E.D. light assemblies and they are mounted on a display panel in a predetermined pattern.

8. A L.E.D. light assembly as recited in claim 7 wherein said display panel is mounted on a trailer.

9. A L.E.D. light assembly comprising:

a refractive lens having a front surface, a rear surface, a top edge, a bottom edge, a left edge and a right edge;

at least one horizontal row of pillow lens modules formed on the rear surface of said refractive lens; said horizontal row having at least two pillow lens modules, said pillow lens modules each having a top edge, a bottom edge, a left edge, a right edge, and a horizontal center line x-axis; the respective right and left edges of adjacent pillow block lens module coincide to form vertical intersection lines;

a plurality of L.E.D.'s each having a longitudinally extending z-axis; an individual L.E.D. is mounted a predetermined distance D1 behind each of said pillow lens modules; the z-axes of said L.E.D.'s being substantially aligned with the horizontal center line x-axes of said pillow lens modules;

a plurality of vertically oriented concave flute strips and each has a longitudinally extending y-axes; said vertically oriented concave flute strips being formed on the front surface of said refractive lens in front of the respective vertical intersection lines between adjacent pillow lens modules and in substantial parallel alignment with said vertical intersection lines; and vertical planar strips are formed on the front surface of said refractive lens intermediate each of said vertically oriented concave flute strips.

\* \* \* \* \*